No. 719,473. PATENTED FEB. 3, 1903.
D. E. KEPFORD.
HORSESHOEING APPARATUS.
APPLICATION FILED MAR. 5, 1901.
NO MODEL.
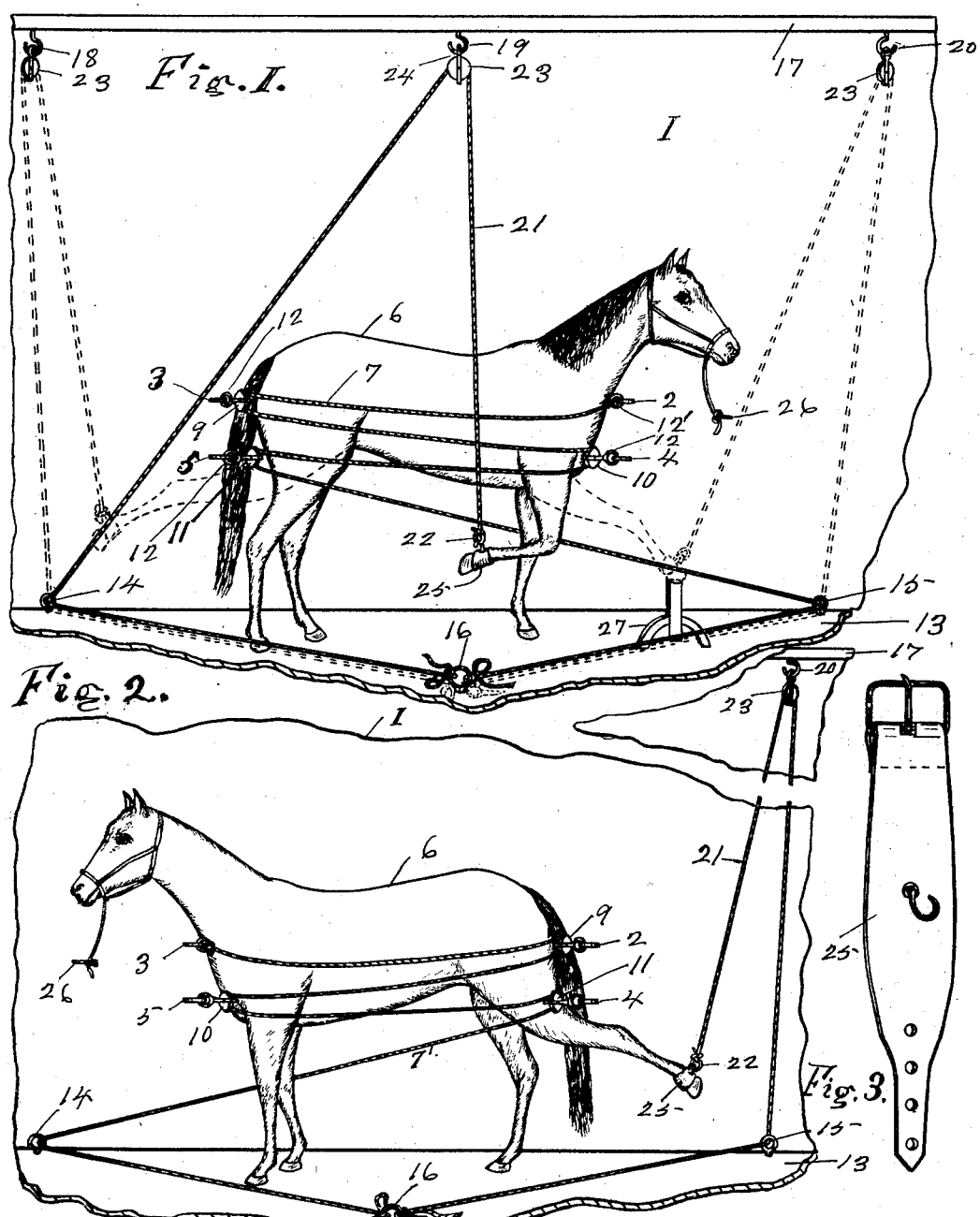
WITNESSES: David E. Kepford INVENTOR
Adelaide Kearns.
Lulu Bulmahn
BY Chapin & Denny
His ATTORNEYS.

UNITED STATES PATENT OFFICE.

DAVID E. KEPFORD, OF MERRIAM, INDIANA.

HORSESHOEING APPARATUS.

SPECIFICATION forming part of Letters Patent No. 719,473, dated February 3, 1903.

Application filed March 5, 1901. Serial No. 49,735. (No model.)

*To all whom it may concern:*

Be it known that I, DAVID E. KEPFORD, a citizen of the United States, residing at Merriam, in the county of Noble, in the State of Indiana, have invented certain new and useful Improvements in Horseshoeing Apparatus; and I do hereby declare that the following is a full, clear, and exact description of the invention, which will enable others skilled in the art to which it appertains to make and use the same, reference being had to the accompanying drawings, which form part of this specification.

My invention relates to improvements in horseshoeing apparatus specially designed and adapted for use with vicious horses.

The object of my present invention is to provide a horseshoeing apparatus adapted for use with vicious and unruly horses of so simple and economical a construction as to be within the reach of all horseshoers and so arranged as to be readily and quickly placed in position or shifted in use and adapted to firmly and securely control the most vicious animal in shoeing without danger of injury to the same.

My improvement consists of two coöperating ropes, straps, or cables with a plurality of hooks, pulleys, and rings, one of said ropes being a retaining-rope, by means of which the animal is firmly held in the desired position for shoeing, and the other rope is an operating-rope, by means of which the animal's feet are successively elevated to a position accessible to the operator.

The novel feature of my invention resides in the simplicity of the means by which the animal is securely held in position and conveniently manipulated by a single operator.

Similar reference-numerals indicate like parts throughout the several views, in which—

Figure 1 is a side elevation of my improvement in position for use, showing the animal secured in position for shoeing by the retaining-rope and also showing the manner of employing the operating-rope for raising the animal's front feet. Fig. 2 is a similar view with the animal reversed and showing how the operating-rope is employed in raising the rear feet. Fig. 3 is a detail of the hock-joint band and hook to which one end of the operating-rope is secured.

At proper points on the side wall 1 of any blacksmith's or farrier's shop are rigidly secured the hooks 2, 3, 4, and 5, of any proper dimensions, the hooks 2 and 4 being a greater distance from the hooks 3 and 5 than the length of a horse, and all of said hooks being a sufficient distance from the floor to permit the retaining-rope, hereinafter described, to properly secure the animal 6, Fig. 1. The said hooks 2, 3, 4, and 5 can of course be replaced by staples and can be fixed in any suitable upright support as well as in the wall 1.

The retaining-rope 7, of proper dimensions, has a ring 12' in its forward end, which is adapted to holdingly engage either of the upper of said hooks 2 and 3. The said retaining-rope 7 is also provided with the pulleys 9, 10, and 11, each of which pulleys has a ring 12, adapted to holdingly engage the said hooks in use.

At suitable points in the floor 13 adjacent to the side wall 1 are rigidly fixed the eyebolts 14 and 15, and at a proper distance from the wall 1 and approximately midway the said eyebolts 14 and 15 is fixed a third eyebolt 16, to which the outer or free ends of the retaining and operating ropes are secured by the operator.

To the ceiling 17, at suitable points above the animal 6, are fixed the hooks 18, 19, and 20 for the use of the operating-rope 21, whose forward end is provided with a ring 22 and a band 25, adapted to be fastened around the hock-joint of each foot successively, the said ring 22 being detachably secured thereto by a hook or other proper manner. A pulley 23 is adapted to be detachably mounted upon said overhead hooks by means of a ring 24, on which the said operating-rope is mounted.

My improvement thus consists of two ropes, seven hooks, four pulleys, and three eyebolts. Of course instead of having one overhead pulley 23, which is shifted from one overhead hook to the other in use, a pulley 23 can be mounted on each of the said overhead hooks.

The manner of employing my invention thus described is obvious and, briefly stated, is as follows: When it is desired to shoe a vicious animal, it is placed against the wall 1 between the forward hooks 2 and 4 and the rear hooks 3 and 5, Fig. 1. The animal is then tied to a proper staple 26 in the said wall 1. The farrier now secures the ring 12' of the retaining-rope 7 to the hook 2 or 3 which is adjacent the animal's head, which in Fig. 1 is the hook 2, then secures the pulleys 9, 10, and 11 to the hooks 3, 4 and 5, respectively, by means of the respective rings 12, after which the said retaining-rope is passed over the said pulleys 9, 10, and 11 and then passed diagonally beneath the animal's body and through the said staple 15 and then back to the said eyebolt 16, where it is securely tied, Fig. 1. The animal 6 is now firmly secured in position, in which all attempt at plunging, surging, or inclining with its weight upon the operator is prevented. The operator now places the said band 25 around the adjacent front foot, secures the said ring 22 thereto, mounts the operating-rope 21 on the pulley 23, which is now suspended from the central overhead hook 19. The operating-rope is then passed through the said eyebolt 14, after which the operator readily raises the said foot up to the desired position beneath the animal's body, as shown in Fig. 1, and ties the free end of the operative rope in the said eyebolt 16. The operator in the same manner can as readily elevate the adjacent rear foot to the desired position beneath the body to place it upon the stand 27 for filing and clenching the shoeing-nails in a well-understood manner. When it is desired to elevate the said rear foot rearwardly into position for placing the shoe thereon, it is readily done by fastening the said band 25 about the hock-joint thereof with one end of the said operating-rope 21 secured thereto, the other end being passed over the said pulley 23 and thence through the said eyebolt 14 or 15, after which it is secured to the said eyebolt 16, as shown by dotted outline in Fig. 1. To place the said forward foot upon the shoer's stand 27 the operator, after placing the band 25 in position thereon and securing one end of the operating-rope thereto, passes the other end of the said rope over said pulley 23, which is now suspended from the hook 20 and then passed through the eyebolt 15 and secured as before, as shown by dotted outline in Fig. 1. It is thus seen that to raise either the front foot or rear foot up to a position beneath the body of the animal, as described, the operating-rope is mounted upon the said pulley 23 when suspended from the middle hook 19, and to raise either the front or rear foot outwardly the operating-rope is mounted on the pulley 23 when suspended from the corresponding hook 18 or 20. Evidently to shoe the remaining front and rear feet the position of the animal is reversed end for end, after which the retaining-rope is also reversed—that is, the ring 12' is secured to the hook 3, the pulley 10 is secured to the hook 5, and the pulleys 9 and 11 are secured to the hooks 2 and 4, respectively—and the said retaining-rope passes through the eyebolt 14 instead of the eyebolt 15 and has its free end tied to the eyebolt 16. Of course the said pulleys 9, 10, and 11 may be omitted, if desired, and the retaining-rope run through rings substituted therefor or even through the said lateral hooks themselves without departing from the spirit and scope of my invention, which consists, primarily, in providing a horseshoeing apparatus consisting of but two operative cooperating ropes with means for securing the same in position.

My improvement is thus cheap, simple, efficient, and reliable and can readily and conveniently be manipulated by the farrier without assistance.

Having thus described my invention, what I desire to secure by Letters Patent is—

In an apparatus of the class described, the combination with a series of fastening devices carried by a vertical support and arranged in two vertical series spaced from each other a distance greater than the length of the animal to be shod, said fastening devices being arranged in substantially the same plane as that of the animal's body, a retaining rope or strap connected to said fastening devices and passed alternately back and forth in a direction longitudinally of the animal's body for securing the latter to said support, an eye arranged in advance of the animal below said fastening devices and through which said retaining rope or strap is passed, the portion of said rope or strap beneath said fastening devices passing from the front of the animal to and between said vertical support and the rear side of the animal's fore legs, and then through said eye, an eye also arranged below said fastening devices and to which the free end of said rope or strap is connected for securing the same, an operating rope or strap connected to the foot to be shod, an overhead support to which said operating rope or strap is connected, said overhead support being adjusted to different positions directly over, in front and in rear of the animal to adapt the operating rope or strap for successive attachment to all of the animal's feet, and an eye arranged in rear of the animal below said fastening devices and through which said operating-rope is passed, the free end of said rope being secured to said eye to which the free end of the retaining-rope is secured.

Signed by me at Merriam, Noble county, and State of Indiana, this 27th day of February, A. D. 1901.

DAVID E. KEPFORD.

Witnesses:
JAMES H. KITT,
AMOS C. KEPFORD.